April 21, 1942.    E. B. SCHULER    2,280,546
PROTEIN SOLUTION, PAINT, AND METHOD
Filed June 17, 1939
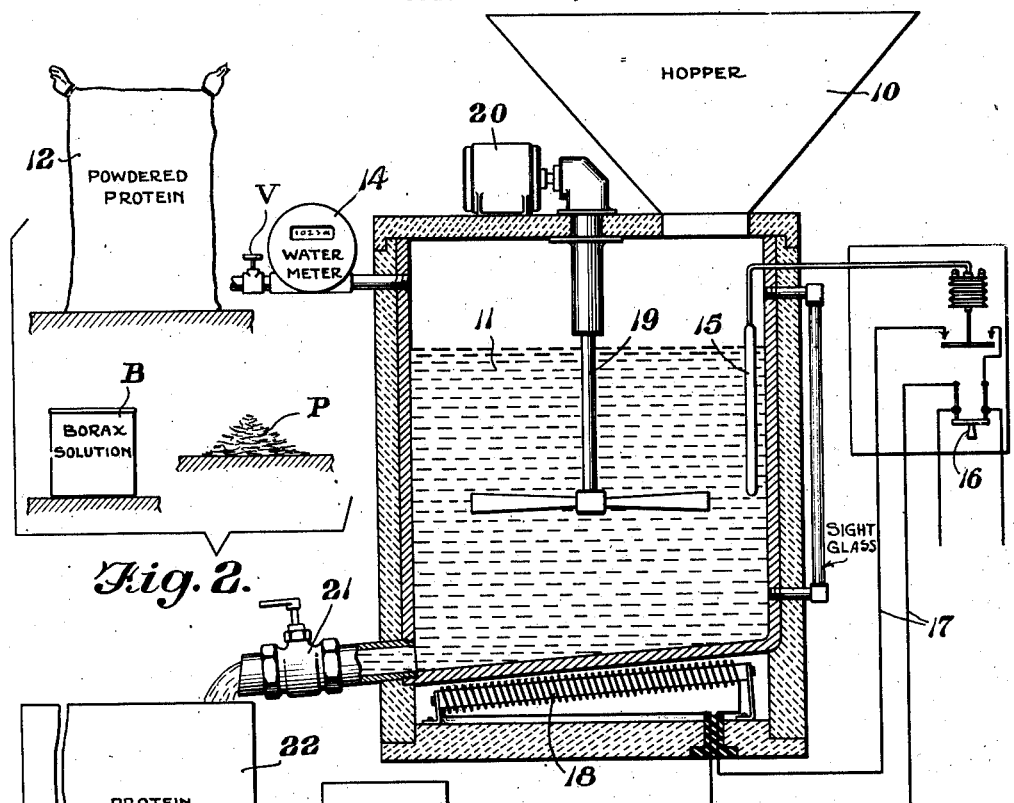
Fig. 2.
Fig. 1.
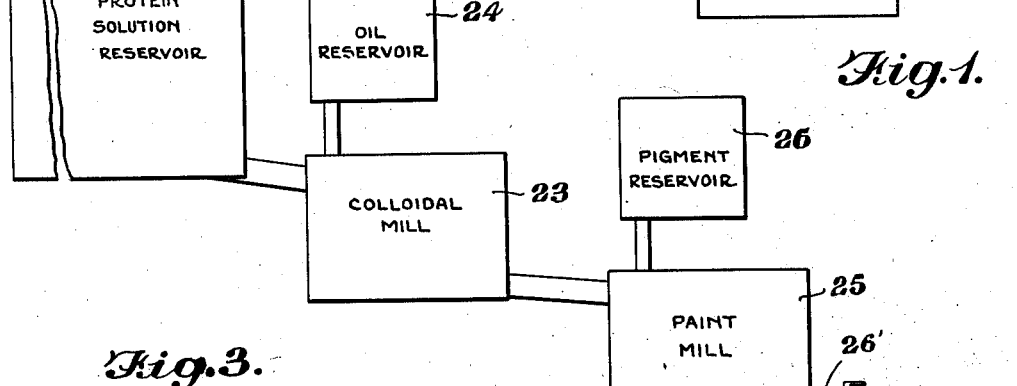
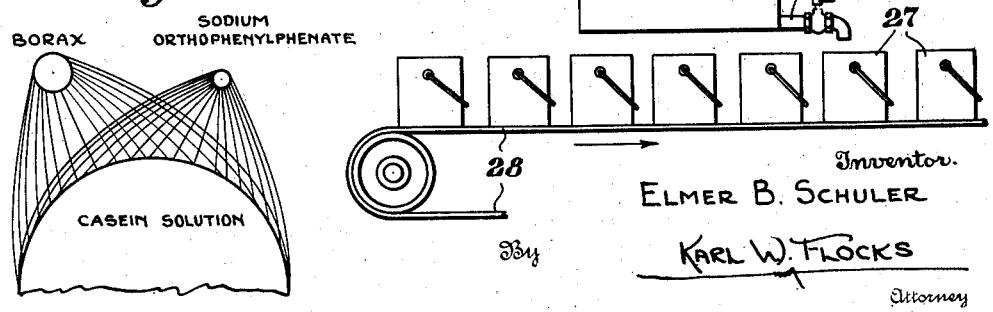
Fig. 3.
Inventor.
ELMER B. SCHULER
By KARL W. FLOCKS
Attorney Patented Apr. 21, 1942

2,280,546

UNITED STATES PATENT OFFICE 2,280,546

PROTEIN SOLUTION, PAINT, AND METHOD

Elmer B. Schuler, Baltimore, Md., assignor to The White Company, Baltimore, Md., a corporation of Maryland Application June 17, 1939, Serial No. 279,743

17 Claims. (Cl. 106—135)

This invention relates to protein solutions and more particularly to novel conjugated phospho protein solutions of relatively low viscosity which may be utilized in the manufacture of paints and the like, and processes of making such protein solutions and paints and the like.

Prior to the instant invention it has been proposed that casein be dissolved with an alkali or alkali material such as sodium hydroxide, ammonia, borax, or like materials. While such agents have been generally effective insofar as placing casein in solution is concerned, yet solutions so effected are not entirely satisfactory because of their tendency to putrefy, evolve an offensive odor, and thereby render such solutions inapplicable for commercial use.

It has been suggested in the past that a germicide or a preservative such as bichloride of mercury, nitrobenzene, or sodium salicylate be added to above mentioned solutions to render them suitable for subsequent utilization. Such solutions containing a germicide or preservative have been more suitable than unpreserved solutions, or solutions having no germicide or preservative, but they are not capable of universal or general use for the known methods of incorporation of germicides make them not entirely indifferent to the solution. Many of the substances which have been recommended as preservatives for casein solutions have certain deleterious effects when used in the casein solutions which are to be used in the manufacture of paste paint. Certain of these materials impart an objectionable color to the paint. Others give it an objectionable odor and furthermore it is well recognized that when these preservatives are added to casein solution in the proportions and manner reported in the literature and in earlier patents the bacterial decomposition of the solution is merely delayed and such solutions have not been suitable for the manufacture of paste paints which should be free from any bacterial decomposition over considerable periods which may be as much as several years.

In order to obviate the necessity for preservatives or germicides for the preservation of casein solutions, the patentee, Atwood, in Patent No. 1,893,608, describes a process of effecting a casein solution which involves, first, swelling the casein with a solution of sodium fluoride and ammonium chloride, and then dissolving the swollen casein with a weak alkali, such as borax, in order to effect the solution definitely on the acid side of the iso-electric point of water. In fact the patentee limits his solutions to pH values within the range of from 4.6 to 7.0.

Subsequent to Atwood, Iddings in Patents No. 2,023,389, 2,154,400, 2,154,401 and Scholz in Patent No. 2,154,362 teach similar methods which involve the use of sodium fluoride as a so-called stabilizing agent, or other stabilizing agents such as piperazine, acetamid, ammonium thiocyanate, or sodium silicates. It is further stated by these patentees that heat may be utilized to stabilize the casein solution and they provide pasteurization temperatures of around 200° F. which are preferred for this purpose. The lower limit of heat level is indicated at 170° F. The stability referred to by these patentees has been defined as the maintenance of uniform viscosity over long periods of time, and the absence of putrefaction during such time. These patentees, according to their specifications, find that their casein solutions have uniform viscosities over long periods of time throughout a pH range extending to within the basic, as well as the acid side of the iso-electric point of water by the utilization of heat at a higher level than that taught at Atwood, and seem to infer that Atwood's solutions would be unsuccessful if allowed to run over to the basic side of the iso-electric point of water. Atwood actually so inferred.

While casein solutions in accordance with the Atwood, Iddings, and Scholz patents have been satisfactory for some purposes yet they have been generally unsatisfactory for use in the fabrication of high grade casein paints having relatively low viscosity making for ready workability and utilization similar to that of oil paints, relatively costly to manufacture because of the special sequence of steps and high heat necessary to effect the final solutions, and because of the production of a non-uniform product which is subject to charring and decomposition due to the high temperatures necessitated by this process. In the commercial preparation of casein solutions metallic or similar vats are utilized to heat the casein or other ingredients. When these metallic vats are heated to a temperature high enough to impart to the casein a temperature of 170° F., or 200° F. or higher, there is a difference in temperature between the temperature of the vat and the temperature of the casein, the temperature of the vat being higher. When casein solutions are prepared in the high temperature range called for by the prior art there is a danger of charring the casein at the surface of the metal vat and also danger of partially decomposing the casein at these elevated temperatures with a resulting darkening of the solution which makes it impossible to secure as white a paint as is contemplated in accordance with the instant invention.

It is an object of the instant invention to provide a protein solution to be used in the fabrication of protein paint including white paints and light tinted paints of relatively low viscosity having favorable workability of general homogeneous fluid mass characteristics, having relatively greater resistance to putrefaction and hydrolysis.

It is a further object of the instant invention to provide a solution suitable for commercial use in the fabrication of protein solutions adapted to be used in the subsequent fabrication of protein paints including white paints and light tinted paints.

It is a still further object of the instant invention to provide commercial protein paints including white paint and light tinted paints having higher resistance to putrefaction and hydrolysis.

Other objects and the nature and advantages of the invention will be apparent from the following description taken in conjunction with the accompanying drawing, wherein Fig. 1 is a schematic view of a system for fabricating protein solutions and paints in accordance with the invention, illustrating the process utilized and the flow of work;

Fig. 2 is a schematic illustration of some of the raw materials which are utilized in the process; and, Fig. 3 is a schematic diagram illustrating the chemical bonding theory which makes for the success of the protein solutions in accordance with the invention.

Referring to the drawing, a batch of protein solution in accordance with the invention may be made by dumping into the funnel 10 which discharges into the vat 11 one hundred pounds of commercial casein which is generally shipped in sacks 12 as illustrated. The valve V in the water line 13 may be opened to permit the entrance into the vat 11 of forty gallons of water as indicated by the water meter 14 at which time the valve V is closed.

The protein is then permitted to soak in the water for about two hours. This preliminary soaking facilitates the dissolving of the casein at a later stage with a minimum of attention and fuel. It is conceivable that in accordance with the invention, the preliminary soaking period may be omitted but then additional fuel and attention will be required to effect the solution.

After the two hour period, the temperature is raised from room temperature to approximately 100° F. and when the 100° F. temperature is achieved, a solution of an organic preservative, which may be phenolic in nature, such as sodium orthophenylphenate, is added in an amount sufficient to completely dissolve the protein, or a blend of borax solution and organic preservative may be utilized in vat 11 to effect the solution. This blend may comprise approximately fourteen pounds of borax and eighteen and one-quarter gallons of water. Then six and five-eighths pounds of sodium orthophenylphenate, P, is added to the ingredients within the vat and the temperature raised to 160° F., never more than 170° F., at which point the thermostat 15 actuates the switch 16 to open the electric circuit 17 operatively connected to the electric resistance heater 18 to effect cessation of the addition of heat to the batch of solution which is clear and ready for use in the fabrication of paint upon cooling.

In accordance with the invention, the sodium orthophenylphenate can be added to the original ingredients of one hundred pounds of casein and forty gallons of water prior to the raising of the temperature to 100° F. and the addition of borax solution, as well as used in the procedure above described. Both procedures will effect a satisfactory product.

The temperature of the casein and water, or casein, water, and sodium orthophenylphenate, is preliminarily raised to 100° F. before adding the borax solution in order to keep the casein solution at a relatively thin viscosity throughout the entire operation and in order to prevent injury to or the stopping of the agitator 19 within the vat 11 which agitator is driven by the motor 20. If the borax solution is added to the cold casein and water mixture, the borax reacting with the casein increases its body very rapidly and the mixture passes through a highly viscous stage which is difficult to handle with mechanical equipment. Hence, if the solution is to be made commercially, the procedure outlined is preferred and a uniform product is thereby effected.

The quantity of sodium orthophenylphenate that is utilized to effect a satisfactory casein solution in accordance with the invention should be upwards of four per cent based on the weight of the casein. It has been suggested in the literature that casein solutions might be preserved by the utilization of from 0.2 to 1 per cent of preservative based on the weight of casein. It has been found in actual practice however, that such proportions will not effect satisfactory preservation of the casein and paste paint incorporating such solutions will show signs of decomposition and putrefaction after a few months. Even when twice or three times the percentage of preservative suggested by the literature is utilized, decomposition and putrefaction is not prevented. Accordingly, upwards of four per cent of preservative of an organic nature such as phenolic compounds, which are water soluble, alkaline in reaction, and have inherent germicidal properties, which four per cent is based on the weight of casein, should be incorporated in the casein solution in accordance with one of the preferred procedures set forth above.

The casein solution, prepared as above, is substantially independent of the pH value within a range relatively close to and on both sides of the iso-electric point of water such as for example, within the range of from pH 6 to 10. To effect the pH value on the acid side such as for example a pH of 6.5, the quantity of borax in the borax solution may be decreased to effect this result. Not only may the casein solution be effected by the utilization of borax, but the borax may be eliminated as already suggested and the quantity of sodium orthophenylphenate be increased correspondingly whereby it becomes the sole solubilizing agent. The preservative and borax are blended for purposes of economy in those cases in which the preservative is more expensive than the borax. If the preservative is less expensive than the borax, the use of borax may be entirely eliminated.

The use of the sodium orthophenylphenate in accordance with the invention is not simply that of a preservative of the type which is added to a solution to effect its preservation. In accordance with the invention, it is significant that some reaction take place between the preservative and the casein in order to effect its preservation and that reaction is peculiar to the extent that the casein be not entirely in solution when the preservative is added. It is significant that the preservative must not be added to protein in complete solution. If the solution is completed with borax or other alkali as suggested in the literature, and then the preservative is added, such solutions when utilized in paste paints will not be satisfactory for the paste paints will decompose and putrefy. However, if the casein is partially dissolved by the use of borax or other alkali and then the solution is completed with an organic compound which may be a phenolic compound such as sodium orthophenylphenate which is alkaline in nature and has inherent germicidal properties, and enough of such organic compound is utilized, that is, upwards of four per cent based on the weight of casein, then a satisfactory casein solution will result which is suitable for use in paste paints and the like which will not putrefy or decompose.

The maximum temperature used in the process is never above 170° F. as above that temperature there is great danger of charring of the casein which would be detrimental to the commercial product which is to be utilized in the manufacture of paste paints. In commercial plant operation, metallic vats are utilized and the heating thereof to temperatures about 170° F. or over may result in definite charring or burning of the protein where it contacts the vats. Solutions prepared above 160° or 170° have a tendency to darken even when great precautions are taken and are not as pale as those prepared in accordance with the instant invention. Accordingly, it has been found that if a satisfactory uniform, plate, uncharred and undecomposed product is to be manufactured in the field, as distinguished from the laboratory, the temperature of 170° F. should not be exceeded.

In the preparation of solutions to be utilized for paste paints, in accordance with the invention, no attempt is made to preliminarily effect a gel-like constituency of the protein prior to its ultimate solution such as when sodium fluoride is used and as is suggested in the literature. In accordance with the instant invention, a low viscosity is maintained throughout the preferred procedure. If desired, the preliminary step of soaking the casein with water may be omitted but the ultimate solution of the casein may be facilitated if it is first soaked with water. Nor is it essential in accordance with the instant invention that a high temperature be utilized together with material such as sodium fluoride, piperazine, ammonium chloride or fluoride in order to effect a casein gel. The preferred process simply effects the solution of the casein with an alkali but it is significant that a portion of the alkali be organic and germicidal in nature and that the proportion of the alkali which has these characteristics be above four per cent based on the weight of casein.

In order to effect the manufacture of paste paint after the chemically preserved solution is effected in accordance with one of the preferred procedures set forth above, the valve 21 may be opened and the solution permitted to flow to the reservoir 22 from whence it is discharged into the colloidal mill 23 which is adapted to receive oil from the reservoir 24. After passing through the colloidal mill 23 the oil emulsified casein solution may be passed to the final roller paint mill 25 to which is fed a desired pigment from the container reservoir 26. After the pigment has been incorporated in the oil emulsified casein solution the casein paste paint is discharged from the conduit 26' into suitable containers 27 which may be placed on the conveyor 28 adapted to pass in filling relationship to the discharge pipe 26'.

The colloidal mill 23 may be any of the commercial type machines available for producing a homogeneous mixture of two liquid phases. The paint mill 25 may be ordinary paint grinding equipment consisting of a paste mixer and a commercial grinding or dispersing mill such as stone mill or roller mill. With certain type of pigments the mixer is all that is necessary to disperse the pigment, and the roller or stone mill may be omitted.

Other ingredients may be added to the paste paints to increase their flexibility, washability and ease of brushing prior to the passing of the emulsified casein solution through the final paint mill. An alternate mode of procedure makes it possible to eliminate the use of the colloidal mill to form the casein-oil emulsion and involves the use of but a single paint mixer and a roller mill and the incorporation of the oil and pigment with the casein solution may be accomplished with this equipment without resorting to the use of a colloidal mill.

Among the pigments suitable for use with casein paste paints fabricated in accordance with the above procedures, are lithopones, titanium pigments, titanated lithopones, zinc sulfide, cadmium reds and yellows, toluidine, hydrated chromium oxide, or any organic or inorganic pigments that are stable in an alkaline solution. Inert pigments having a low index of refraction such as magnesium silicate, clay, diatomaceous silica, or any other so-called inert pigment which does not contain soluble or readily hydrolizable calcium salts may be utilized. The drying or semi-drying oil may be poppy-seed oil, soya bean oil, linseed oil, China-wood oil, or a flexible varnish containing any of these with the addition of resinous material.

Though protein solutions suitable for use in paste paints may be satisfactory over relatively long periods of time when the oil is omitted, it has been found that when the solutions or paste paints are to be utilized in torrid climates and stores for periods of several years without decomposition and loss of viscosity and uniformity, it is essential that oil be added in approximately the quantity given in the following formula:

| | | |
|---|---|---|
| Lithopone | pounds | 236 |
| Magnesium silicate | do | 162 |
| Casein solution | gallons | 34½ |
| Refined soya bean oil | do | 2 |
| Soluble pine needle oil | do | 1⅞ |

Paste paint solutions and casein solutions including this quantity of oil may be stored under extremely adverse conditions of high temperature and over very long periods of time without decomposition or loss of viscosity.

The processes described may be carried out to effect protein solutions in which the protein is either of animal or vegetable nature. For example, the protein may be of the conjugated phospho type such as casein or the protein may be derived from soya beans. When casein is utilized, it should be preferably of the lactic or hydrochloric acid precipitated type. When soya protein, or other vegetable protein, or other protein is used instead of casein, it may be necessary to vary the proportions of the ingredients to compensate for the different solubility characteristics of the different proteins. The ratio of preservative to inorganic alkali, however, may be maintained substantially as set forth earlier in the specification.

In carrying out a process in accordance with the invention, it is never necessary to go above 170° F. nor is it necessary to maintain this temperature for any considerable period of time as taught by prior patents. Hence, the instant invention is not to be confused with processes involving pasteurization of the protein solution or other heat treatments similar to pasteurization.

Referring to Fig. 3, the powdered protein is represented by a relatively large mass, the borax by a much smaller mass and the preservative a still smaller mass. The bonding lines indicate that the preservative must react with all of the protein in order to be effective for if the casein is entirely placed in solution by the borax and then the preservative is added, a satisfactory protein solution will not be effected and it will decompose and putrefy. The borax may be entirely eliminated, thereby insuring the proper reaction between the preservative and the protein. For purposes of economy, when the cost of preservative is high, a properly proportioned blend of alkali or preservative as described may be utilized.

It will be obvious to those skilled in the art that various changes may be made in this device without departing from the spirit of the invention and therefore the invention is not limited to what is shown in the drawing and described in the specification but only as indicated in the appended claims.

What is claimed is:

1. A stable casein paste paint solution comprising casein completely solubilized in sodium orthophenylphenate.

2. A stable casein paste paint solution comprising casein at least partially solubilized in sodium orthophenylphenate in an amount upwards of four percent based on the weight of casein.

3. The method of manufacturing a stable casein solution suitable for use in a paste paint comprising first soaking powdered casein in water for a time sufficient to facilitate subsequent solution, heating the mixture of water and casein to a temperature of not more than 170° F., adding to the mixture sodium orthophenylphenate in an amount upwards of four percent based on the weight of casein before the casein is completely in solution and before the casein is in such state of solution that all of the sodium orthophenylphenate cannot act as a solubilizer, adding additional alkali subsequent to the step of adding sodium orthophenylphenate in order to effect the finished solution.

4. An unscorched stable casein solution having a pH value on the basic side and suitable for use in a paste paint comprising casein partially solubilized with upwards of four percent of sodium orthophenylphenate based on the weight of casein and partially solubilized by additional alkali with the relation between the casein and the sodium orthophenylphenate being such that all of the sodium orthophenylphenate is used to effect partial solubilization of the casein.

5. A stable protein paste paint solution comprising protein of the conjugated phospho type completely solubilized in sodium orthophenylphenate.

6. A stable protein paste paint solution comprising protein of the conjugated phospho type at least partially solubilized in sodium orthophenylphenate in an amount upwards of four per cent based on the weight of portein.

7. The method of manufacturing a stable protein solution suitable for use in a paste paint comprising first soaking powdered protein of the conjugated phospho type in water for a time sufficient to facilitate subsequent solution, heating the mixture of water and protein to a temperature of not more than 170° F., adding to the mixture sodium orthophenylphenate in an amount upwards of four per cent based on the weight of protein before the protein is completely in solution and before the protein is in such state of solution that all of the sodium orthophenylphenate cannot act as a solubilizer, adding additional alkali subsequent to the step of adding sodium orthophenylphenate in order to effect the finished solution.

8. A stable protein paste paint solution comprising completely solubilized protein of the conjugated phospho type, said protein being partially solubilized in sodium orthophenylphenate in an amount upwards of four per cent based on the weight of protein and partially solubilized in additional other alkali.

9. A method of manufacturing a protein solution suitable for use in a paste paint comprising soaking powdered protein of the conjugated phospho type in water for a time sufficient to facilitate subsequent solution, heating the mixture of water and protein to a temperature of 170° F. or less, adding to the mixture sodium orthophenylphenate in an amount upwards of four per cent based on the weight of protein.

10. A method as in claim 9 in which the protein is casein.

11. A method as in claim 5 in which the protein is derived from the soya bean.

12. A method as in claim 9 in which the protein is of vegetable origin.

13. A method as in claim 9 in which the quantity of sodium orthophenylphenate is insufficient to place the protein in solution, and adding additional alkali to effect the solution of the protein.

14. A method as in claim 9, the quantity of sodium orthophenylphenate being insufficient to effect the solution of the protein, and the step of adding borax to the mixture to effect a solution of the protein.

15. A method as in claim 9 and incorporating drying oil and pigment into the solution to effect a paste paint.

16. A protein paste paint of approximately the following formula:

| | | |
|---|---|---|
| Lithopone | pounds | 236 |
| Magnesium silicate | do | 162 |
| Protein solution | gallons | 34½ |
| Refined soya bean oil | do | 2 |
| Soluble pine needle oil | do | 1⅞ | in which the protein solution is in accordance with claim 6.

17. A protein paste paint having high resistance to climatic conditions of high temperature comprising a protein solution in accordance with claim 6, soya bean oil, and pine needle oil.

ELMER B. SCHULER.